United States Patent
Nakano et al.

(10) Patent No.: US 7,513,945 B2
(45) Date of Patent: Apr. 7, 2009

(54) INK COMPOSITION

(75) Inventors: Keitaro Nakano, Nagano (JP); Takashi Oyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 11/481,395

(22) Filed: Jul. 5, 2006

(65) Prior Publication Data

US 2007/0044684 A1    Mar. 1, 2007

(30) Foreign Application Priority Data

Jul. 6, 2005    (JP) .......................... P.2005-197699

(51) Int. Cl.
*C09D 11/02* (2006.01)

(52) U.S. Cl. ................. 106/31.6; 106/31.86; 106/31.89

(58) Field of Classification Search ................ 106/31.6, 106/31.86, 31.89
See application file for complete search history.

(56) References Cited

FOREIGN PATENT DOCUMENTS

| JP | 11-343436 | 12/1999 |
|----|-----------|---------|
| JP | 2005-68252 | 3/2005 |
| WO | 02/055619 | 7/2002 |

OTHER PUBLICATIONS

Computer-Generated English Translation of Specification and Claims and Patent Abstracts of Japan of 2005-68252 dated Mar. 17, 2005.

Computer-Generated English Translation of Specification and Claims and Patent Abstracts of Japan of 11-343436 dated Dec. 14, 1999.

*Primary Examiner*—Jerry Lorengo
*Assistant Examiner*—Veronica Faison Gee
(74) *Attorney, Agent, or Firm*—Ladas and Parry LLP

(57) ABSTRACT

The present invention provides an ink composition comprising a metal flake-containing metallic pigment, a glycol ether and an organosiloxane-based surfactant.

12 Claims, No Drawings

INK COMPOSITION

FIELD OF THE INVENTION

The present invention relates to an ink composition, and more particularly to an ink composition which contains a metal flake-containing metallic pigment and is excellent in printing stability and glossiness of printed matter in ink jet recording.

BACKGROUND OF THE INVENTION

As ink jet recording systems, there are known various ink jet recording systems such as a system (electric field controlling system) in which ink is ejected utilizing electrostatic attraction, a system (drop-on-demand system or pressure pulse system) in which ink is ejected utilizing driving pressure of a piezoelectric element, and a system (bubble or thermal system) in which ink is ejected utilizing pressure developed by forming bubbles and allowing them to grow by high heat. By these systems, highly detailed images can be obtained.

Further, in an ink for ink jet recording, there is sometimes used a pigment having metallic luster (hereinafter also referred to as a metallic pigment) which comprises a metal powder having metallic luster (hereinafter also simply referred to as a metal powder) such as aluminum and a coloring material for imparting any other color tone.

In order to impart metallic luster photoluminescent decoration and the like to images obtained by an ink for ink jet recording, an ink jet ink containing fragments of a laminate having a metal-deposited layer and a resin layer is disclosed (for example, see patent document 1).

Further, in order to improve permeability into a medium, a technique of adding an acetylene glycol-based surfactant or a polyether-modified organosiloxane-based surfactant into a metallic pigment ink is reported (for example, see patent document 2).

Patent Document 1: JP-A-11-343436
Patent Document 2: JP-A-2005-68252

SUMMARY OF THE INVENTION

However, this technique of patent document 1 can not satisfy printing stability and glossiness of printed matter in ink jet recording. Further, even the technique of patent document 2 has been insufficient when seen from the viewpoint of printing stability, because scattering occurs.

Accordingly, an object of the invention is to solve the above-mentioned problems, and to provide an ink composition which is improved in printing stability and glossiness of printed matter in ink jet recording and contains a metal flake-containing metallic pigment.

Other objects and effects of the invention will become apparent from the following description.

The present inventors have found that printing stability and glossiness of printed matter in ink jet recording have been improved by allowing a specific compound to be contained in an ink composition containing metallic pigment using metal flakes, thus completing the invention.

That is to say, the invention is achieved by the following constitution:

(1) An ink composition comprising a metal flake-containing metallic pigment, a glycol ether and an organosiloxane-based surfactant;

(2) The ink composition of the above 1, wherein the content of the glycol ether is 7% by weight or more based on the total amount of the ink composition;

(3) The ink composition of the above 1 or 2, wherein the glycol ether is one that is liquid at normal temperature; and (4) The ink composition of any one of the above 1 to 3, wherein the glycol ether is an alkylene glycol monoether or an alkylene glycol diether.

The ink composition of the invention containing the metal flake-containing metallic pigment can be improved in printing stability and glossiness of printed matter in ink jet recording by containing the glycol ether and the organosiloxane-based surfactant.

DETAILED DESCRIPTION OF THE INVENTION

The composition of the invention will be described in detail below.

The metallic pigment contained in the ink composition of the invention is not particularly limited as long as it is one using metal flakes, and examples thereof include one obtained by separating a metal or metal compound layer of a composite pigment original having a structure comprising the metal or metal compound layer and a resin layer for release which are sequentially laminated on a surface of a sheet-shaped substrate, from the above-mentioned sheet-shaped substrate at the above-mentioned resin layer for release as a boundary, and pulverizing it.

Although the metal or the metal compound used in the metal or metal compound layer of the composite pigment original for producing the metallic pigment used in the invention is not particularly limited as long as it has a function such as having metallic luster, there are used aluminum, silver, gold, nickel, chromium, tin, zinc, indium, titanium and the like. At least one of these simple metals, metal compounds and alloys or mixtures thereof is used.

The metal or metal compound layer is preferably formed by vacuum deposition, ion plating or sputtering. Although the thickness of the metal or metal compound layer is not particularly limited, it preferably ranges from 30 to 150 nm. Less than 30 nm results in poor reflectivity or brightness and deteriorated performance as the metal pigment, whereas exceeding 150 nm results in increased apparent specific gravity and decreased dispersion stability of the metallic pigment. An unnecessary increase in the metal or metal compound layer only causes an increase in weight of particles, and even when the film thickness is larger than this, the reflectivity and brightness are not so changed.

The resin layer for release in the composite pigment original for producing the metallic pigment used in the invention, which is an undercoat layer of the above-mentioned metal or metal compound layer, is a releasable layer for enhancing releasability from the surface of the sheet-shaped substrate. Although the resin used in this resin layer for release is not particularly limited, preferred is polyvinyl alcohol, polyvinyl butyral, polyethylene glycol, polyacrylic acid, polyacrylamide, a cellulose derivative, polyvinyl butyral, an acrylic acid copolymer or a modified nylon resin.

An aqueous solution of one or a mixture of two or more of the above-mentioned resins is applied and subjected to drying and the like, thereby forming the resin layer. In the coating solution, additives such as a viscosity adjusting agent can be contained.

The coating of the resin layer for release is performed by gravure coating, roll coating, blade coating, extrusion coating, dip coating, spin coating or the like which has been generally used. After the coating and drying, the surface is smoothed by calendering treatment as needed.

Although the thickness of the resin layer for release is not particularly limited, it is preferably from 0.5 to 50 μm, and more preferably from 1 to 10 μm. Less than 0.5 μm results in a deficiency of an amount as a dispersion resin, whereas exceeding 50 μm results in easy separation at an interface with the pigment layer when rolled up.

The sheet-shaped substrate in the composite pigment original for producing the metallic pigment used in the invention is not particularly limited, and examples thereof include releasable films such as polytetrafluoroethylene, polyethylene, polypropylene, polypropylene, a polyester film such as polyethylene terephthalate or polyethylene naphthalate, a polyamide film such as 66 nylon or 6 nylon, a polycarbonate film, a triacetate film and a polyimide film.

The sheet-shaped substrate is preferably polyethylene terephthalate or a copolymer thereof.

Although the thickness of the sheet-shaped substrate is not particularly limited, it is preferably from 10 to 150 μm. 10 μm or more results in no problem with regard to handleability in the process or the like, and 150 μm or less results in high flexibility and no problem with regard to rolling up, separation and the like.

Further, the above-mentioned metal or metal compound layer may be sandwiched between protective layers. The protective layers include a silicon oxide layer and resin layer for protection.

Although the silicon oxide layer is not particularly limited as long as it is a layer containing silicon oxide, it is preferably formed of a silicon alkoxide such as tetraalkoxysilane or a polymer thereof by a sol-gel method.

An alcohol solution in which the above-mentioned silicon alkoxide or polymer thereof has been dissolved is applied and baked by heating, thereby forming a coating of the silicon oxide layer coating.

The resin layer for protection is not particularly limited as long as it is a resin insoluble in a dispersion medium, and examples thereof include polyvinyl alcohol, polyethylene glycol, polyacrylic acid, polyacrylamide, a cellulose derivative or the like. However, it is preferably formed of polyvinyl alcohol or a cellulose derivative.

An aqueous solution of one or a mixture of two or more of the above-mentioned resins is applied and subjected to drying and the like form the layer. In the coating solution, additives such as a viscosity adjusting agent can be contained.

Coating of the above-mentioned silicon oxide and resins is performed in the same manner as that of the above-mentioned resin layer for release.

Although the thickness of the above-mentioned protective layer is not particularly limited, it preferably ranges from 50 to 150 nm. Less than 50 nm results in insufficient mechanical strength, whereas exceeding 150 nm results in excessively high strength, which causes difficulty of dispersion and separation at an interface with the metal or metal compound layer in some cases.

Further, a coloring material layer may be provided between the above-mentioned "protective layer" and "metal or metal compound layer".

The coloring material layer is introduced in order to obtain any colored composite pigment, and is not particularly limited as long as it can contain a coloring material capable of imparting any color tone or color hue in addition to the metallic luster and brightness of the metallic pigment used in the invention. The coloring material used in this coloring material layer may be either a dye or a pigment. As the dye or the pigment, a known one can be appropriately used.

In this case, the "pigment" used in the coloring material layer means a natural pigment, a synthetic organic pigment, a synthetic inorganic pigment or the like as defined in the field of general pigment chemistry, and differs from one processed into a laminated structure, such as the "composite pigment" of the invention.

Although a method for forming this coloring material layer is not particularly limited, it is preferred to form it by coating.

Further, when the coloring material used in the coloring material layer is the pigment, it is preferred to further contain a resin for coloring material dispersion. As the resin for coloring material dispersion, preferred is polyvinyl butyral, an acrylic acid copolymer or the like. In this case, the coloring material layer is preferably prepared as a thin resin film by dispersing or dissolving the pigment, the resin for coloring material dispersion, another additive as needed, and the like in a solvent, forming a uniform liquid film as a solution by spin coating, and then drying it.

In addition, in the production of the composite pigment original for producing the metallic pigment used in the invention, it is preferred in view of operational efficiency that the formation of both the above-mentioned coloring material layer and the protective layer is performed by coating.

The composite pigment original for producing the metallic pigment used in the invention may also have a layer structure having the plurality of sequentially laminated structures of the above-mentioned resin layer for release and the metal or metal compound layer. In that case, the whole thickness of the laminated structure of the plural metal or metal compound layers, that is to say, the thickness of metal or metal compound layer-resin layer for release-metal or metal compound layer . . . resin layer for release-metal or metal compound layer excluding the sheet-shaped substrate and the resin layer for release just above the substrate, is preferably 5,000 nm or less. When it is 5,000 nm or less, cracks and separation are difficult to occur even when the composite pigment original is rounded in roll form, resulting in excellent storability. Further, when the pigment is prepared, it has excellent brightness, so that this is preferred.

Furthermore, there is also mentioned a structure that the resin layer for release and the metal or metal compound layer are sequentially laminated on both surfaces of the sheet-shaped substrate, but the invention should not be construed as being limited thereto.

The metallic pigment used in the invention can be obtained by separating the metal or metal compound layer of the above-mentioned composite pigment original from the above-mentioned sheet-shaped substrate at the resin layer for release as a boundary, and finely dividing it by pulverization.

Although a separation treatment method is not particularly limited, preferred are a method of performing the separation by immersing the above-mentioned composite pigment original in a liquid, and a method of performing an ultrasonic treatment concurrently with immersion in a liquid, thereby performing a separation treatment and a pulverization treatment of the separated composite pigment.

In the metallic pigment obtained as described above, the resin layer for release plays a role of a protective colloid, and it is possible to obtain a stable dispersion only by performing a dispersion treatment in a solvent. Further, in the ink composition using the metallic pigment, the resin derived from the resin layer for release also undertakes a function of giving adhesiveness to a recording medium such as paper.

When the ink composition of the invention is used in an ink jet printer, it is preferred that the above-mentioned metallic pigment has an average thickness of 10 to 100 nm and a maximum particle size in particle size distribution of 10 μm or less.

The glycol ether contained in the ink composition of the invention includes ethylene glycol-based ethers and propylene glycol-based ethers having as a base either an aliphatic group such as methyl, n-propyl, i-propyl, n-butyl, i-butyl, hexyl and 2-etylhexyl, an allyl group having a double bond, or a phenyl group. They are colorless and have little odor. Since they have an ether group and a hydroxyl group in their molecules, they have both characteristics of an alcohol and an ether. The glycol ether is preferably one that is liquid at normal temperature and normal pressure.

Examples thereof include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol mono-iso-propyl ether, diethylene glycol dimethyl ether, diethylene glycol diethyl ether, triethylene glycol monomethyl ether, triethylene glycol monoethyl ether, triethylene glycol monobutyl ether, propylene glycol monomethyl ether, propylene glycol monoethyl ether, dipropylene glycol monomethyl ether, dipropylene glycol monoethyl ether and the like.

Such a glycol ether is preferably contained in an amount of 7% by weight or more based on the total amount of the ink composition.

The organosiloxane-based surfactant contained in the ink composition of the invention will be described.

The organosiloxanes are a group of organic compounds containing silicon, oxygen and organic groups as main components. The organosiloxanes include unmodified ones in which side chains or terminals are methyl groups, or side chains are partially phenyl groups or hydrogen groups, and modified ones in which side chains or terminals are organic groups (such as amino groups, epoxy groups and polyether groups).

Examples thereof include polydimethylsiloxane, polyether-modified polydimethylsiloxane, polyester-modified polydimethylsiloxane, amino-modified polydimethylsiloxane, carboxyl-modified polydimethylsiloxane, carbinol-modified polydimethylsiloxane and the like.

The above-mentioned organosiloxane-based surfactant is preferably contained in an amount of 0.1% by weight to 5% by weight based on the total amount of the ink composition.

The ink composition of the invention is one in which the above-mentioned metallic pigment, glycol ether and organosiloxane-based surfactant are contained by dispersing them in an appropriate solvent.

Although the solvent used in the ink composition of the invention may be either aqueous or organic, the organic solvent is preferred in terms of securing reliability as ink.

As the organic solvent, there can be preferably used, for example, an alcohol (for example, methyl alcohol, ethyl alcohol, propyl alcohol, butyl alcohol or fluorinated alcohol), a ketone (for example, acetone, methyl ethyl ketone or cyclohexanone), a carboxylic acid ester (for example, methyl acetate, ethyl acetate, propyl acetate, butyl acetate, methyl propionate or ethyl propionate), an ether (for example, diethyl ether, dipropyl ether, tetrahydrofuran or dioxane) or the like.

In addition, preferred examples of the organic solvents include a mixture of the diethylene glycol compound that is liquid under normal temperature and normal pressure and the dipropylene glycol compound that is liquid under normal temperature and normal pressure, as described in International Publication 2002/055619, and the like.

When the organic solvent is used, a nonionic polyoxyethylene derivative can be additionally contained. As the polyoxyethylene derivative, preferred is a compound that is liquid under normal temperature and normal pressure. The above-mentioned polyoxyethylene derivative can impart resolubility to an oil-based ink composition.

The above-mentioned polyoxyethylene derivatives include, for example, polyoxyethylene alkyl ethers such as polyoxyethylene cetyl ethers (for example, Nissan Nonion P-208; NOF Corporation), polyoxyethylene oleyl ethers (for example, Nissan Nonion E-202S and E-205S: NOF Corporation) and polyoxyethylene lauryl ethers (for example, EMALGEN 106 and 108: Kao Corporation); polyoxyethylene alkyl phenol ethers such as polyoxyethylene octyl phenol ethers (for example, Nissan Nonion HS-204, HS-205, HS-206 and HS-208: NOF Corporation); sorbitan monoesters such as sorbitan monocaprylate (for example, Nissan Nonion CR-08R: NOF Corporation) and sorbitan monolaurate (for example, Nissan Nonion LP-20R: NOF Corporation); polyoxyethylene sorbitan monoesters such as polyoxyethylene sorbitan monostearate (for example, Nissan Nonion OT-221: NOF Corporation), polycarboxylic acid-based polymeric surfactant (FLOWLEN G-70: Kyoeisha Chemical Co., Ltd.); polyoxyethylene higher alcohol ethers (for example, EMALGEN 707 and 709: Kao Corporation); tetraglycerin oleate (for example, Poem J-4581: Riken Vitamin Co., Ltd.); nonyl phenol ethoxylate (for example, ADEKA TOL NP-620, NP-650, NP-660, NP-675, NP-683 and NP686: Asahi Denka Co., Ltd.); aliphatic phosphate esters (for example, ADEKA COL CS-141E and TS-230E: Asahi Denka Co., Ltd.); sorbitan sesquioleate (for example, SORGEN 30: Dai-ich Kogyo Seiyaku Co., Ltd.); sorbitan monooleate (for example, SORGEN 40; Dai-ich Kogyo Seiyaku Co., Ltd.); polyethylene glycol sorbitan monolaurate (for example, SORGEN TW-20: Dai-ich Kogyo Seiyaku Co., Ltd.); and polyethylene glycol sorbitan monooleate (for example, SORGEN TW-80: Dai-ich Kogyo Seiyaku Co., Ltd.). Further, as the above-mentioned polyoxyethylene derivatives, acetylene glycol-based surfactants can be used. Specific examples thereof include Surfynol 104, 82, 465, 485 and TG (all of them are available from Air Products and Chemicals, Inc.), and Olfine STG and Olfine E1010 (both are trade names of products available from Nissin Chemical Industry Co., Ltd.).

Further, it is also possible to use other commercial products as the above-mentioned polyoxyethylene derivatives. Specific examples thereof include Nissan Nonion A-10R and A-13R (NOF Corporation), FLOWLEN TG-740W and D-90 (Kyoeisha Chemical Co., Ltd.), EMALGEN A-90 and A-60 (Kao Corporation) and NOIGEN CX-100 (Dai-ich Kogyo Seiyaku Co., Ltd.).

When the organic solvent is used, in the ink composition of the invention, the content of the above-mentioned polyoxyethylene derivative can be appropriately selected depending on resolubility to be imparted. However, it is preferably from 5 to 200% by weight, and more preferably from 30 to 120% by weight, based on the content of the pigment in the ink composition.

When the organic solvent is used, the ink composition of the invention can contain a dispersant. As the dispersant, there can be used any dispersant used in an ordinary oil-based ink composition, particularly in an oil-based ink composition for ink jet recording. In particular, it is preferred to use a dispersant effectively acting when the solubility parameter of the organic solvent is from 8 to 11. As such a dispersant, it is also possible to utilize a commercial product, and specific examples thereof include polyester-based polymeric compounds such as Hinoacto KF1-M, T-6000, T-7000, T-8000, T-8350P and T-8000EL (manufactured by Takefu Fine Chemicals Co., Ltd.), Solsperse 20000, 24000, 32000, 32500, 33500, 34000 and 35200 (Avecia K.K.), Disperbyk-161, 162, 163, 164, 166, 180, 190, 191 and 192 (BYK-Chemie GmbH), FLOWLEN DOPA-17, 22, 33 and G-700 (Kyoeisha Chemical Co., Ltd.), AJISPER PB821 and PB711 (Ajinomoto Co., Inc.), and LP4010, LP4050, LP4055, POLYMER 400, 401, 402, 403, 450, 451 and 453 (EFKA Chemicals B.V.).

In the ink composition of the invention, the content of the above-mentioned dispersant can be appropriately selected depending on the pigment to be dispersed. However, it is preferably from 5 to 200% by weight, and more preferably from 30 to 120% by weight, based on the content of the pigment in the ink composition.

When the organic solvent is used, the ink composition of the invention can additionally contain other additives contained in an ordinary oil-based ink composition. Such additives include, for example, a stabilizer (for example, an antioxidant or an ultraviolet absorber), a surfactant, and/or a binder resin. As the antioxidant, there can be used, for example, BHA (2,3-butyl-4-oxyanisole) or BHT (2,6-di-t-butyl-p-cresol). As the ultraviolet absorber, there can be used, for example, a benzophenone compound or a benzotriazole compound. Further, as the surfactant, there can be used any of cationic, anionic, amphoteric and nonionic surfactants. Furthermore, the viscosity of the oil-based ink composition of the invention can be adjusted with the binder resin. The viscosity (viscosity at a temperature of 20° C.) of the oil-based ink composition of the invention is, for example, 10 mPa·s, and more preferably 5 mPa·s.

As the binder resin, there can be used, for example, an acrylic resin, a styrene-acrylic resin, a rosin-modified resin, a phenol resin, a terpene-based resin, a polyester resin, a polyamide resin, an epoxy resin, a vinyl chloride-vinyl acetate copolymer resin, a cellulose-based resin (for example, cellulose acetate butyrate) and a vinyl toluene-α-methylstyrene copolymer resin. The binder resin can also further improve fixability of the pigment to a recording medium by the amount thereof added.

The ink composition of the invention can be prepared by well known methods in common use. For example, initially, the metallic pigment, the dispersant and the above-mentioned liquid solvent are mixed, and then, a pigment dispersion is prepared by a ball mill, a bead mill, an ultrasonic wave, a jet mill or the like to perform adjustment so as to have desired ink characteristics. Subsequently, the binder resin, the above-mentioned liquid solvent and other additives (for example, a dispersing aid and a viscosity adjusting agent) are added under stirring, thereby being able to obtain the pigment ink composition.

Besides, the composite pigment original may be once subjected to the ultrasonic treatment in a liquid solvent to form a composite pigment dispersion, followed by mixing with a necessary liquid solvent for ink. Further, the composite pigment original can also be directly subjected to the ultrasonic treatment in a liquid solvent for ink to prepare the ink composition as it is.

The physical properties of the ink composition of the invention are not particularly limited. However, for example, the surface tension thereof is preferably from 20 to 50 mN/m. When the surface tension is less than 20 mN/m, the ink composition wetly spreads over a surface of the printer head for ink jet recording or exudes therefrom, resulting in difficulty of ejecting ink droplets in some cases. When the surface tension exceeds 50 mN/m, the ink composition does not wetly spread over a surface of the recording medium, resulting in failure to perform good printing in some cases.

The ink composition of the invention can be applied to various ink jet recording systems. That is to say, it can be applied to various ink jet recording systems such as an electric field controlling system in which ink is ejected utilizing electrostatic attraction, a drop-on-demand system (or a pressure pulse system) in which ink is ejected utilizing driving pressure of a piezoelectric element, and further, a bubble or thermal system in which ink is ejected utilizing pressure developed by forming bubbles and allowing them to grow by high heat.

EXAMPLES

The present invention will be illustrated in greater detail with reference to the following Examples, but the invention should not be construed as being limited thereto.

1. Production of Aluminum Pigment Dispersion (1) A resin layer coating solution having the following composition was applied onto a 100 μm-thick PET film by spin coating to form a uniform liquid film, and then, dried to prepare a thin resin film layer.

| (Resin Layer Coating Solution) | |
|---|---|
| S-LEC BL-10 (butyral resin manufactured by Sekisui Chemical. Co., Ltd.) | 3.0% by weight |
| Glycerol | 2.0% by weight |
| IPA (isopropyl alcohol) | balance |

On the above-mentioned resin layer, an aluminum vapor-deposited layer having a thickness of 70 nm was formed by using the following apparatus.

Apparatus: Vacuum depositing apparatus Model VE-1010, Shinkuu Device K.K.

(3) Separation, finely dividing and dispersion treatments were performed on the PET film having a laminate of the resin layer and the aluminum vapor-deposited layer formed by the above-mentioned methods, at the same time in IPA by using an ultrasonic disperser to produce a aluminum pigment dispersion.

The pigment content of the aluminum pigment dispersion obtained by this method was 5.0% by weight.

2. Preparation of Metallic Pigment-Containing Ink Composition

Using the aluminum pigment dispersion prepared by the above-mentioned method, metallic pigment-containing ink compositions having compositions of Table 1 described below were prepared.

TABLE 1

| | Example 1 | Example 2 | Example 3 | Comparative Example 1 | Comparative Example 2 |
|---|---|---|---|---|---|
| Aluminum Pigment Dispersion | 10 | 10 | 10 | 10 | 10 |
| TEGmBE | 40 | 40 | 10 | 40 | 40 |
| BYK-UV3500 | 0.1 | | 0.1 | | |
| BYK-UV3570 | | 0.1 | | | |

TABLE 1-continued

|  | Example 1 | Example 2 | Example 3 | Comparative Example 1 | Comparative Example 2 |
|---|---|---|---|---|---|
| Surfynol 465 |  |  |  |  | 0.1 |
| IPA | balance | balance | balance | balance | balance |

TEGmBE: Triethylene glycol monobutyl ether
BYK-UV3500: Polyether-modified polydimethylsiloxane manufactured by BYK-Chemie Japan
BYK-UV3570: Polyester-modified polydimethylsiloxane manufactured by BYK-Chemie Japan
Surfynol 465: acetylene glycol-based surfactant manufactured by Nissin Chemical Industry Co., Ltd.

3. Evaluation of Printing and Printing Stability (1) Utilizing an ink jet printer, PX-G900, manufactured by Seiko Epson Corporation, a solid pattern was printed on PM Photographic Paper (manufactured by Seiko Epson Corporation) at normal temperature and normal pressure using each metallic pigment-containing ink composition described above.

(2) Using the metallic pigment-containing ink compositions of Example 1 to 3 and Comparative Examples 1 and 2, the state of ejection and the state of printing of the solid pattern printed by the above-mentioned method were visually observed. The results of evaluation are shown in Table 2 described below. Evaluation indices are as follows:

A: A solid pattern was formed without scattering.
B: Scattering slightly occurred, but a solid pattern was formed.
C: Scattering occurred, and blanks are generated during printing.
D: Printing was impossible.

TABLE 2

|  | Example 1 | Example 2 | Example 3 | Comparative Example 1 | Comparative Example 2 |
|---|---|---|---|---|---|
| Printing and Printing Stability | A | A | A | B | D |

4. Evaluation of Glossiness

Using each of the metallic pigment-containing ink compositions of Example 1 to 3 and Comparative Examples 1 and 2, a uniform solid pattern was coated on PM Photographic Paper (manufactured by Seiko Epson Corporation) with a bar coater. The glossiness of the solid pattern coated was measured with a glossmeter "MULTI GLOSS 268" manufactured by Konica Minolta. The results of evaluation are shown in Table 3 described below. Evaluation indices are as follows:

A: The glossiness at an incident angle of 60° was 75 or more.
B: The glossiness at an incident angle of 60° was from 50 to less than 75.
C: The glossiness at an incident angle of 60° was less than 50.

TABLE 3

|  | Example 1 | Example 2 | Example 3 | Comparative Example 1 | Comparative Example 2 |
|---|---|---|---|---|---|
| Glossiness | A | A | A | B | C |

From the results described above, the ink compositions of Examples 1 to 3 were excellent in printing stability and glossiness.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-167699 filed Jul. 6, 2005, and the contents thereof are herein incorporated by reference.

What is claimed is:

1. An ink composition comprising a metal flake-containing metallic pigment, a glycol ether and an organosiloxane-based surfactant, wherein the metallic pigment is a composite consisting of a metal or metal compound layer and a resin release layer.

2. The ink composition according to claim 1, wherein the content of the glycol ether is 7% by weight or more based on the total amount of the ink composition.

3. The ink composition according to claim 1, wherein the glycol ether is one that is liquid at normal temperature and normal pressure.

4. The ink composition according to claim 1, wherein the glycol ether is an alkylene glycol monoether or an alkylene glycol diether.

5. The ink composition according to claim 1, wherein the metallic pigment is formed by laminating a substrate with the resin release layer and laminating the resin release layer with the metal or metal compound layer; separating the resin and metal or metal compound layers from the substrate by releasing the resin release layer from the substrate; and pulverizing the separated resin and metal or metal compound layers to form the composite metallic pigment.

6. The ink composition according to claim 5, wherein the metal or metal compound layer is laminated on the resin release layer with a thickness of from 30 to 150 nm.

7. The ink composition according to claim 1, wherein the resin release layer is laminated on the substrate with a thickness of from 0.5 to 5 μm.

8. The ink composition according to claim 1, wherein the metallic pigment has an average thickness of 10 to 100 nm.

9. The ink composition according to claim 1, wherein the resin release layer comprises a resin selected from the group consisting of polyvinyl alcohol, polyvinyl butyral, polyethylene glycol, polyacrylic acid, polyacrylamide, a cellulose derivative, polyvinyl butyral, an acrylic acid copolymer or a modified nylon resin.

10. The ink composition according to claim 1, wherein the glycol ether is triethylene glycol monobutyl ether.

11. The ink composition according to claim 1, wherein the metallic pigment, glycol ether and organosiloxane-based surfactant are present in the ink composition such that, when the ink composition is used to coat a solid pattern on photographic paper with a bar coater, the solid pattern coated on the photographic paper has a glossiness at an incident angle of 60° of 75 or more.

12. The ink composition according to claim 11, wherein the glycol ether is triethylene glycol monobutyl ether.

* * * * *